United States Patent [19]

Tokunaga

[11] 4,419,457

[45] Dec. 6, 1983

[54] PRODUCTION OF POLYURETHANE FOAMS

[75] Inventor: Mototsugu Tokunaga, Kyoto, Japan

[73] Assignee: Dai-Ichi Kogyo Seiyaku Co., Ltd., Kyoto, Japan

[21] Appl. No.: 429,902

[22] Filed: Sep. 30, 1982

[30] Foreign Application Priority Data

Oct. 6, 1981 [JP] Japan ................... 56-159827

[51] Int. Cl.$^3$ ............................... C08G 18/14
[52] U.S. Cl. ................... 521/65; 427/385.5; 521/67; 521/121; 521/131
[58] Field of Search ........... 521/67, 131, 65, 121; 427/385.5

[56] References Cited

U.S. PATENT DOCUMENTS

| | | |
|---|---|---|
| 2,993,013 | 7/1961 | Wolfe .................... 521/67 |
| 3,450,649 | 6/1969 | Youker .................. 521/67 |
| 3,582,499 | 6/1971 | Rogers et al. .......... 521/67 |
| 3,627,710 | 12/1971 | Crary .................... 521/67 |
| 3,639,301 | 2/1972 | Youker .................. 521/67 |
| 3,646,178 | 2/1972 | Traübel et al. ........ 521/67 |
| 3,772,220 | 11/1973 | Parker et al. .......... 521/67 |
| 3,839,241 | 10/1974 | Harrell .................. 521/67 |
| 3,989,869 | 11/1976 | Neumaier et al. ..... 521/67 |
| 4,260,530 | 4/1981 | Reischl et al. ......... 521/67 |
| 4,314,034 | 2/1982 | Fulmer et al. ......... 521/67 |

Primary Examiner—Maurice J. Welsh
Attorney, Agent, or Firm—Millen & White

[57] ABSTRACT

There is provided a method of producing an open-cell polyurethane foam comprising heating a mixture of an aqueous emulsion of a polyurethane-forming composition and a fluorocarbon compound of 1 to 3 carbon atoms having a boiling point of 5° to 100° C. The above emulsion may further contain an ionic surfactant.

7 Claims, No Drawings

PRODUCTION OF POLYURETHANE FOAMS

FIELD OF THE INVENTION

This invention relates to a method of producing an open-cell polyurethane foam using a new aqueous emulsion formulation.

DESCRIPTION OF THE PRIOR ART

Open-cell polyurethane foams are generally used as synthetic leather and carpet backings, for instance. For the production of open-cell polyurethane foams, the following methods, among others, are generally employed. In one of the methods, a polyol component and a diisocyanate (generally, tolylene diisocyanate) component are cast into a mold and allowed to expand to shape in situ under pressure and heat in the presence of an inert solvent. Another known method comprises admixing a polyol component and a diisocyanate component and causing the mixture to react and undergo chemical foaming in the presence of a small amount of water. The maximum foaming rate that can be achieved in an open-cell foam is invariably about 10 times the initial volume but because a highly reactive toxic diisocyanate component is used, neither of the methods is easily available to anybody and anywhere. Moreover, the product foam is liable to crack and the internal cellular structure is invariably not as fine as would be desired.

On the other hand, as one of the recent technologies for the production of synthetic leather, there is known a method in which an aqueous emulsion containing a polyurethane-forming composition is mechanically foamed and deposited on a substrate in the presence of a foam stabilizer such as ammonium stearate to about 2.5 to 3.5 times the initial volume. However, in this mechanical foaming method, the foam tends to decrease in volume in the course of drying and this decrease is particularly pronounced when an inorganic filler has been incorporated. In addition, in such mechanical foaming, the foaming rate of the product is influenced by the viscosity of the foam in such a manner that the larger the foaming rate, the higher is the viscosity of the foam, with the result that an open-cell foam having a fine cellular texture can hardly be obtained at any foaming rate in excess of 5 times. For this reason, whenever an open-cell foam having a higher foaming rate is demanded, it is imperative to lower the concentration of the emulsion and, so that the stability of the foam may be maintained throughout processing, to add an excess amount of a foam stabilizer. As a result, the product will have only an inadequate mechanical strength, have an insufficient bonding strength for substrates or develop surface cracks, thus failing to obtain the desired performance characteristics.

After an intensive research to overcome the above-mentioned disadvantages, the present inventors have developed the novel technology of this invention.

DETAILED DESCRIPTION OF THE INVENTION

Thus, this invention, in one aspect, relates to a method of producing an open-cell polyurethane foam comprising heating a mixture of an aqueous emulsion of a polyurethane-foaming composition and a fluorocarbon compound of 1 to 3 carbon atoms having a boiling point of 5° to 100° C. In another aspect, this invention relates to a method wherein said aqueous emulsion further contains an ionic surfactant in a proportion of 0.1 to 5 weight percent based on its solid content.

The term "boiling point" as used herein stands for one under the atmospheric pressure.

The term "polyurethane-foaming emulsion" as used in this specification and the claims appended thereto means any emulsion containing a polyhydroxy compound a polyisocyanate and, if necessary, a chain extender containing a plurality of reactive hydrogen atoms which may be known per se, and having a film-forming property. Preferably, it means a polyurethane-forming composition modified by the introduction of water-soluble groups of emulsified with an emulsifying agent.

Specific examples of such emulsions are Implanil DLN, Implanil DLH, etc. in the Implanil D Series (Bayer A.G.), Alizelack S-1060, Alizelack S-2020, Alizelack S-4040N, etc. in the Alizelack S Series (Hodogaya Chemical Co., Ltd.) and the products in the Leathermin W Series (Dainichi Seika Kogyo, Ltd.).

If required, such polyurethane emulsions can be used in combination with other synthetic resins. Among such other synthetic resins are solvent-soluble type, water-soluble type and aqueous emulsion type resins such as polyacrylic resins, polyamide resins, melamine reisns, polyvinyl acetate resins, polyvinyl alcohol resins, polyacetal resins, urea resins, polypropylene reisns, epoxy resins fluorocarbon resins, polycarbonate resins, etc., as well as solvent-soluble type and water-soluble polyurehtane resins. If necessary, fillers may also be incorporated in the emulsion. Among such fillers are various inorganic fillers, pigments, etc. such as clay, talc, mica, bentonite, diatomaceous earth, silicate, calcium, carbonate, aluminum hydroxide, magnesium hydroxide, antimony trioxide, magnesium carbonate, ultramarine, iron oxide and so on.

The fluorocarbon compound employed in accordance with this invention has 1 to 3 carbon atoms and a boiling point of 5° to 100° C. and, thus, includes such species as $CCl_3F$ (b.p. 23.8° C.), $CHCl_2F$ (b.p. 8.9° C.), $C_2Cl_3F_3$ (b.p. 47.6° C.), $C_2Br_2F_4$ (b.p. 47.3° C.), etc. With any fluorocarbon compound whose boiling point is outside the range of 5° to 100° C. and/or which ontains more than 3 carbon atoms, it is impossible to obtain the desired open-cell foam having a fine internal cellular structure. The level of addition of such fluorocarbon compound is 0.1 to 25 weight parts and preferably 1 to 5 weight parts to every 100 weight parts of the nonvolatile matter contained in the polyurethane-forming emulsion. If the amount of the fluorocarbon compound is outside the range of 0.1 to 25 weight parts, it is impossible to obtain an open-cell foam of fine cellular structure, either. If necessary, it is possible to add water-miscible solvents with boiling points below 200° C., such as alcohols (e.g. isopropyl alcohol), ethers (e.g. dimethyl ether), esters (e.g. ethyl acetate), ketones (e.g. acetone), and amides (e.g. dimethylformamide).

The polyurethane-forming emulsion employed according to this invention generally contains 15 to 80 weight percent of solids (nonvolatile matter) in water, wherein said solids have been evenly dispersed as fine particles of 0.05 to 10μ in diameter either with the aid of an emulsifier or without an emulsifier. Accordingly, the emulsion is suitable for dispersing the fluorocarbon compound uniformly therein. However, to disperse and emulsify the fluorocarbon compound evenly, a polyurethane-forming emulsion alone is sometimes insufficient. Thus, in mechanical foaming, it is sometimes necessary to use an auxiliary compound which would assist in accomplishing a uniform dispersion and emulsifying and yielding a stable high-volume foam. Therefore, in such cases, an ionic surfactant is additionally employed. The ionic surfactant according to this invention may be selected from among those anionic surfactants, cationic surfactants and amphoteric surfactants which are known per se, as well as the corresponding fluorinated surfactants. The anionic surfactants mentioned above may for example be RCOOM, ROSO$_3$M,

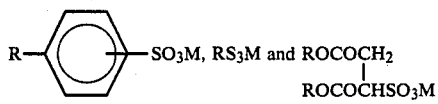

[wherein R is a C$_{8-18}$ alkyl group; M is an alkali metal, NH$_4$ or the like]. The cationic surfactants include, for example,

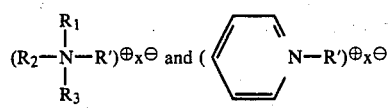

[wherein R' is a C$_{8-18}$ alkyl group; R$_1$, R$_2$ and R$_3$ each is a C$_{1-18}$ alkyl group; X is a halogen atom]. The amphoteric surfactants may for example be R"NHR$_4$COOH [wherein R" is a C$_{8-18}$ alkyl group; R$_4$ is —CnH$_{2n}$— (wherein n is 1 to 8]. The anionic fluorinated surfactants include, among others, R'$_f$OC$_6$H$_4$SO$_3$M, R'$_f$OC$_6$H$_4$COOM, R'$_f$OC$_6$H$_4$SO$_2$N(CH$_3$)CH$_2$COOM, R$_f$COOM, R$_f$SO$_2$N(C$_2$H$_5$)CH$_2$COOM, R$_f$CH$_2$CH$_2$O(C$_2$H$_5$)-$_n$SO$_3$M, R$_f$CH$_2$CH$_2$SCH$_2$CH$_2$CONHCH$_2$CH$_2$SO$_3$M, R$_f$SO$_2$N(C$_2$H$_5$)(C$_2$H$_4$O)$_n$SO$_3$M, R'$_f$OC$_6$H$_4$COO(C$_2$H$_4$O)$_n$SO$_3$M, R'$_f$OC$_6$H$_4$CH$_2$OPO$_3$M$_2$, R'$_f$OC$_6$H$_4$SO$_2$N(R)(CH$_2$CH$_2$O)$_n$SO$_3$M, R$_f$SO$_3$M, R$_f$CH$_2$CH$_2$OSO$_3$M, R'$_f$OC$_6$H$_4$S, R'$_f$OC$_6$H$_4$CON(CH$_3$)CH$_2$COOM, R'$_f$OC$_6$H$_4$CON(CH$_3$)CH$_2$CH$_2$SO$_3$M, R$_f$CH$_2$CH$_2$COOM [wherein R'$_f$ is a C$_6$, C$_8$, C$_9$, C$_{10}$, C$_{12}$ fluoroalkenyl group; M is a monovalent metal, NH$_4$, NH$_3$CH$_2$CH$_2$OH or NH$_2$(CH$_2$CH$_2$OH)$_2$; R$_f$ is a C$_6$-C$_{12}$ fluoroalkyl group; R is a C$_1$-C$_2$ alkyl group; n is 1 to 10].

The cationic fluorinated surfactants may for example be R'$_f$(OCH$_2$CH$_2$)$_n$N$^⊕$(CH$_3$)$_3$I$^⊖$, R'$_f$OC$_6$H$_4$CONHCH$_2$CH$_2$CH$_2$N$^⊕$(CH$_3$)$_3$I$^⊖$, R$_f$CONHCH$_2$CH$_2$N$^⊕$(CH$_3$)$_3$I$^⊕$, R$_f$CH$_2$CH$_2$SCH$_2$COOC$_2$H$_4$N$^⊕$(CH$_3$)$_3$I$^⊖$, R$_f$SO$_2$NHCH$_2$CH$_2$CH$_2$N$^⊕$(CH$_3$)$_3$I$^⊖$, R'$_f$OC$_6$H$_4$SO$_2$NHCH$_2$CH$_2$CH$_2$N$^⊕$(CH$_3$)$_3$I$^⊖$, R'$_f$OC$_6$H$_4$CH$_2$N$^⊕$(CH$_3$)$_3$I$^⊖$ [R'$_f$ is a C$_6$, C$_8$, C$_9$, C$_{10}$, C$_{12}$ fluoroalkenyl group; R$_f$ is a C$_6$-C$_{12}$ fluoroalkyl group; n is 1 to 8].

The amphoteric surfactants may for example be R$_f$CONH CH$_2$CH$_2$CH$_2$N$^⊕$(CH$_3$)$_2$CH$_2$CH$_2$COO$^⊖$, R$_f$SO$_2$NHCH$_2$CH$_2$CH$_2$N$^⊖$(CH$_3$)$_2$CH$_2$CH$_2$COO$^⊖$, R'$_f$OC$_6$H$_4$CH$_2$N$^⊖$(CH$_3$)$_2$CH$_2$COO$^⊖$, [R'$_f$ is a C$_6$, C$_8$, C$_9$, C$_{10}$, C$_{12}$ fluoroalkenyl group; R$_f$ is a C$_6$-C$_{12}$ fluoroalkyl group].

Selection of these ionic surfactants depends on the type and amount of the polyurethane-forming emulsion and, to a larger extent, on the type and amount of the fluorocarbon compound. When, for instance, a fluorocarbon compound boiling at 5° to 40° C. is employed, it is advantageous to use a fluorinated ionic surfactant having vaporization-suppressive and high emulsifying activities. In case a fluorocarbon compound boiling at 40° to 100° C. is employed, it is advisable to use such ionic surfactants as ammonium stearate, alkylphenol polyethylene glycol sulfate esters, etc. The amount of such ionic surfactant is virtually optional but preferably within the range of 0.1 to 5 weight parts to each 100 weight parts of the nonvolatile content of the polyurethane-forming emulsion. The ionic surfactant is first dissolved in water or in a co-solvent such as alcohol and after the fluorocarbon compound has been either dispersed and emulsified or dissolved therein, is added to the polyurethane-forming composition. Generally, the ionic surfactant is preferably added to the polyurethane-forming composition before the mechanical beating operating is initiated.

To obtain an open-cell foam from the aqueous emulsion containing a polyurethane-forming composition according to this invention, the emulsion is preliminarily foamed by mechanical stirring to a foaming rate of 1.5 to 5 times and, then, the fluorocarbon compound is vaporized by heating to achieve a foaming rate of 2 to 15 times.

Compared with the conventional mechanically foamed product, the open-cell foam obtainable from the aqueous emulsion of polyurethane-forming composition in accordance with this invention features a higher foaming rate, a finer internal cellular structure, a reduced weight, a soft feeling or handle, and improved gas permeability and water absorption characteristics. Therefore, improved grades of synthetic leather, carpet backing, etc. can be easily produced by mere application of the aqueous emulsion of this invention to a flexible substrate followed by heating. Moreover, the method is by far simpler and more economical than the conventional production methods. Furthermore, when the aqueous emulsion of polyurethane-forming composition according to this invention is applied in the print dyeing of paper, textile fabrics, etc., improved three-dimensional prints can be accomplished. Thus, three-dimensional patterns can be reproduced on wall paper, T shirts, bags, etc.

To obtain such three-dimensional prints, it is common practice to incorporate a foaming agent in a polyvinyl chloride resin and, after a foaming reaction, imprint the desired pattern under the pressure of a patterned roll. However, since the method produces a three-dimensional pattern by pressing a previously foamed layer, the cells are partially collapsed to leave only a reduced thickness and detract from the soft feeling which is a desired quality in any foam.

By using a polyurethane emulsion instead of the polyvinyl chloride resin which is inherently less soft, this invention overcomes the above-mentioned disadvantages. The aqueous emulsion of polyurethane-foaming composition according to this invention is mechanically foamed, applied directly to a flexible substrate such as paper or cloth by means of a printing roll or a gravure-printing roll to reproduce a desired pattern thereon, and only then, the coating is foamed. It is, therefore, evident that the invention provides a soft product having a three-dimensional pattern that has never been obtainable by the prior art process. Furthermore, the aqueous emulsion of polyurethane-forming composition according to this invention is useful in such industrial applications as industrial adsorbents, filters, etc.

The following examples are intended to illustrate this invention in further detail. In these examples, all parts and percents are by weight.

EXAMPLE 1

(1) Production of an aqueous emulsion containing a polyurethane-forming composition

| Polyurethane-forming composition: | Impranil DLN (nonvolatile 40%, Bayer A.G.) | 70 parts |
| --- | --- | --- |
| | Impranil DLH (nonvolatile 45%, Bayer A.G.) | 10 parts |
| Fluorocarbon: | $C_2Cl_3C_3$ | 0.5 part |
| Others: | Elastron C-9 (aqueous polyurethane solution, Dai-ichi Kogyo Seiyaku Co., Ltd.) | 5 parts |
| | Boncoat 3750 (aqueous polyacrylic resin emulsion, Dainippon Ink & Chemicals, Inc. | 3 parts |
| | Sodium monohydrogen phosphate | 0.2 part |
| | Aluminum dust | 40 parts |
| | Isopropyl alcohol | 2 parts |

(2) Production of an open-cell foam in synthetic leather and its properties

The above aqueous emulsion was stirred well to be well foamable and, then, mechanically foamed to a foaming rate of 3.5 times with a household electric mixer. The partially foamed composition was applied in a thickness of 0.3 mm to a polyurethane-pretreated polyester nonwoven fabric. The coating was then dried by heating at 120° C. for 20 minutes to give a synthetic leather having an open-cell coating.

The foam had a satisfactory open-cell structure ensuring a high air-permeability and an excellent feeling.

EXAMPLE 2

(1) Production of an aqueous emulsion containing a polyurethane-forming composition An aqueous emulsion containing a polyurethane-forming composition was prepared according to the following formula. A control aqueous emulsion was also prepared using the same formula except for the omission of the fluorocarbon compound.

| Polyurethane-forming composition: | Impranil DLN (nonvolatile 40%, Bayer A.G.) | 100 parts |
| --- | --- | --- |
| Fluorocarbon: | $C_2Cl_3F_3$ | 8 parts |
| Ionic surfactant: | Ammonium lauryl sulfate | 1 part |
| Others: | Sumitex Resin M-3 (Water-soluble melamine resin, Sumitomo Chemical Co., Ltd.) | 4 parts |
| | Sumitex Accelerator ACX (Catalyst, Sumitomo Chemical Co., Ltd.) | 0.5 part |
| | Boncoat 3750 (Aqueous polyacrylic resin emulsion, Dainippon Ink & Chemicals, Inc.) | 4 parts |
| | Water | 30 parts |

(2) Production and properties of an open-cell foam

The above aqueous emulsion containing a poly-urethane forming composition was stirred well to be foamable and, then, mechanically foamed to 3.5 times by means of a household electric mixer. The emulsion was applied in a thickness of 0.5 mm to a sheet of mold-release paper. The coating was then heated at 115° C. for 5 minutes to give an open-cell foam. The control emulsion was treated similarly to give a foam. The properties of these foams are shown in Table 1.

TABLE 1

| | Thickness | Specific gravity | Condition of foam | Feeling | (Note 1) Water absorption | (Note 2) Permeability to air |
| --- | --- | --- | --- | --- | --- | --- |
| This invention | 3.2 m/m | 0.042 | Open-cell, fine cellular structure | Chamois-like, soft and flexible | o | 7,400 ml/cm² min |
| Control | 0.42 m/m | 0.162 | Smooth surface with coarse underlying structure | Resilient and slimy | x | 4,500 ml/cm² min |

Note 1
Water absorbency - The absorption of water is measured by dripping 0.1 ml of ink-colored water on the open-cell foam. o: water-absorbent; x: not water-absorbent.
Note 2
Air permeability - An $N_2$ gas bomb, a pressure-reducing valve, a three-way cock, a sample mount, and a water-containing flask are assembled in that sequency using a pressure-resistant rubber tubing. The flask is open to the atmosphere. After the flow of $N_2$ gas is accurately set to 10 l/cm²/min. with the pressure-reducing valve, the three-way cock is communicated with the sample mount and the volume of water emerging in a period of 20 sec. is measured. The volume of permeating air per cm² of the specimen is calculated.

EXAMPLE 3

| Polyurethane-forming composition: | Aizelack S-2020 (nonvolatile 40%, Hodogaya Chemical Co., Ltd.) | 70 parts |
| --- | --- | --- |
| Fluorocarbon: | $C_2Br_2F_4$ | 10 parts |
| Ionic surfactant: | Sodium lauroyl sarcosinate | 1 part |
| Others: | Sumitex Resin M-3 (water-soluble melamine resin, Sumitomo Chemical Co., Ltd.) | 4 parts |
| | Sumitex Accelerator ACX (catalyst, Sumitomo Chemical | 0.5 part |

-continued

| | Co., Ltd.) | |
|---|---|---|
| | Aluminum oxide | 40 parts |
| | Isopropyl alcohol | 3 parts |
| | Water | 5 parts |

The foamable aqueous emulsion of a polyurethaneforming composition according to the above formula was mechanically foamed to a foaming rate of 3.0 times by means of a household electric mixer and coated in a thickness of 2 mm on a sheet of nonflammable wall paper. The coating was dried by heating at 120° C. for 10 minutes to give a wall paper having an open-cell foam backing. The foam had a fine open-cell structure, a thickness of 4.8 mm, a foaming rate of about 7 times, and a specific gravity of 0.13.

The wall paper backed by the above open-cell foam was lightweight, nonflammable and excellent in sound- and heat-insulation properties.

EXAMPLE 4

| Polyurethane-forming composition: | Aizelack S-4040N (nonvolatile 45%, Hodogaya Chemical Co., Ltd.) | 100 parts |
|---|---|---|
| Fluorocarbon: | $C_2Cl_3F_3$ | 5 parts |
| Ionic surfactant: | Ammonium stearate (20% solution) | 5 parts |
| Others: | Sumitex Resin M-3 (water-soluble melamine resin, Sumitomo Chemical Co., Ltd.) | 6 parts |
| | Sumitex Accelerator ACX (catalyst, Sumitomo Chemical Co., Ltd.) | 0.7 part |
| | Boncoat 3750 (Aqueous polyacrylic resin emulsion, Dainippon Ink & Chemicals, Inc.) | 4 parts |
| | Ultramarine | 10 parts |
| | Water | 5 parts |

The foamable aqueous emulsion of polyurethane-forming composition according to the above formula was mechanically foamed to a foaming rate of 3.0 times by means of a household electric mixer and applied to a knitted polyester coton fabric by the rotary screen printing technique. The fabric was dried at 120° C. for 7 minutes to give a knitted fabric having a three-dimensional patterns.

This product had a deep relief pattern, a soft feeling and a high degree of flexibility.

The shirt made from the fabric had excellent laundering resistance, an attractive appearance and, therefore, an excellent marketablity.

EXAMPLE 5

| Polyurethane-forming composition: | Impranil DLN (nonvolatile 40%, Bayer A.G.) | 100 parts |
|---|---|---|
| Fluorocarbon: | $C_2Cl_3F_3$ | 5 parts |
| Ionic surfactant: | Sodium lauryl sulfate | 1 part |
| | $C_8F_{17}SO_3Na$ | 0.2 part |
| Others: | Sumitex Resin M-3 (water-soluble melamine resin, Sumitomo Chemical Co., Ltd.) | 7 parts |
| | Sumitex Accelerator ACX (catalyst, Sumitomo Chemical Co., Ltd.) | 1 part |
| | Ultramarine | 3 parts |
| | Calcium carbonate | 20 parts |
| | Water | 10 parts |

The foamable aqueous emulsion containing a polyurethane-forming composition in accordance with the above formula was mechanically foamed to a foaming rate of 5.0 times by means of a household electric mixer and coated on the reverse side of a nylon-tufted fabric, the thickness of the coating being adjusted to 2 mm with a doctor knife. The coating was then dried by heating at 120° C. for 10 minutes to give a finished carpet. The backing of the carpet was a lightweight, soft, air-permeable open-cell structure having a thickness of 4.5 mm and a specific gravity of 0.06. This carpet fitted intimately to the installation surface, would not slip, and had high resilient recovery and cushioning properties.

What is claimed is:

1. Method of producing an open-cell polyurethane foam comprising heating a mixture of an aqueous emulsion of a polyurethae-forming composition and a fluorocarbon compound of 1 to 3 carbon atoms having a boiling point of 5° to 100° C.

2. Method as claimed in claim 1 wherein the solid content of said aqueous emulsion is 15 to 80 weight percent and the amount of said fluorocarbon compound is 0.1 to 25 weight percent based on said solid content.

3. Method as claimed in claim 2 wherein said aqueous emulsion further contains an ionic surfactant in a proportion of 0.1 to 5 weight percent based on said solid content.

4. Method as claimed in claim 1 which includes a step of mechanically foaming prior to heating.

5. Method as claimed in claim 4 which further includes a step of applying the mechanically foamed mixture to a flexible substrate.

6. Method as claimed in claim 1 wherein said fluorocarbon compound is $CCl_3F$, $CHCl_2F$, $C_2Cl_3F_3$ or $C_2Br_2F_4$.

7. Method as claimed in claim 1 wherein the mixture contains a water-miscible solvent.

* * * * *